United States Patent
Alotto (10) Patent No.: US 8,469,182 B2
(45) Date of Patent: Jun. 25, 2013

(54) QUICK-REMOVE CONVEYOR BELT, IN PARTICULAR FOR TRANSPORTING FOOD PRODUCTS TO A PACKAGING STATION

(75) Inventor: Valerio Alotto, San Mauro Torinese (IT)

(73) Assignee: Felice S.R.L., Novara (IT)

( * ) Notice: Subject to any disclaimer, the term of this patent is extended or adjusted under 35 U.S.C. 154(b) by 112 days.

(21) Appl. No.: 13/228,901

(22) Filed: Sep. 9, 2011

(65) Prior Publication Data
US 2013/0062167 A1 Mar. 14, 2013

(51) Int. Cl.
*B65G 23/44* (2006.01)

(52) U.S. Cl.
USPC .......................................................... 198/813

(58) Field of Classification Search
USPC ..................... 198/813, 810.03, 835
See application file for complete search history.

(56) References Cited

U.S. PATENT DOCUMENTS

| | | | | |
|---|---|---|---|---|
| 4,846,338 | A * | 7/1989 | Widmer | 198/813 |
| 5,022,514 | A * | 6/1991 | Lofberg | 198/813 |
| 6,216,848 | B1 * | 4/2001 | Zens | 198/813 |
| 6,298,981 | B1 * | 10/2001 | Hosch et al. | 198/813 |
| 6,371,283 | B1 | 4/2002 | Manchester | |
| 6,695,124 | B2 * | 2/2004 | Nixon | 198/813 |
| 8,146,734 | B2 * | 4/2012 | Shoji | 198/813 |

FOREIGN PATENT DOCUMENTS

| | | |
|---|---|---|
| DE | 103 43 539 | 6/2005 |
| DE | 20 2008 010 781 | 12/2008 |
| DE | 20 2008 009 151 | 2/2009 |
| FR | 2663309 | 12/1991 |
| JP | 10-129821 | 5/1998 |
| JP | 2001-58713 | 3/2001 |
| WO | WO 2004/009475 | 1/2004 |

OTHER PUBLICATIONS

Italian Search Report for Italian Application No. ITT020110801 dated Mar. 26, 2012.

* cited by examiner

*Primary Examiner* — James R Bidwell
(74) *Attorney, Agent, or Firm* — Patterson & Sheridan, L.L.P.

(57) ABSTRACT

A belt conveyor configured to convey foodstuff products to a packaging station. The belt conveyor includes a stationary structure and a supporting surface comprising a plurality of plates removably carried by the stationary structure. The belt conveyor also includes a belt having a rectilinear conveying branch in contact with the supporting surface and a return branch. The belt conveyor includes a motor-driven roller co-operating with the belt for continuously feeding the belt in a conveying direction. The belt conveyor further includes a return assembly for sending the belt back between the return branch and the conveying branch. The return assembly comprising at least one return member supported at its ends by a pair of arms having at least one pair of fork-like seats. The belt conveyor further includes a control device for displacing the motor-driven roller between a working position and a disassembly position.

6 Claims, 14 Drawing Sheets

FIG. 14

QUICK-REMOVE CONVEYOR BELT, IN PARTICULAR FOR TRANSPORTING FOOD PRODUCTS TO A PACKAGING STATION

FIELD OF THE INVENTION

The present invention relates in general to the packaging sector and regards a belt conveyor designed in particular to convey foodstuff products to a packaging station.

Lines for packaging foodstuff products envisage a complex conveying system between the stations for production of the products and the packaging stations. The lines for conveying the foodstuff products to the packaging stations tend to get dirty rapidly on account of contact with the products. In particular, the parts in direct contact with the products, such as the conveyor belts that carry and feed the products tend to get dirty.

Plants for the production of foodstuff products must respect very strict standards of environmental hygiene. It is particularly important to avoid accumulation of residue of foodstuff products that could give rise to formation of bacteria.

To prevent the formation of bacteria, the lines for conveying the products must be periodically disassembled and washed.

Removal of the belts for washing the conveyors is a long and laborious operation that entails stoppage of the conveying lines for long periods of time.

OBJECT AND SUMMARY OF THE INVENTION

The object of the present invention is to provide a belt conveyor that will enable the operations of disassembly and reassembly to be carried out in a simple and fast way.

According to the present invention, said object is achieved by a belt conveyor having the characteristics forming the subject of Claim 1.

The claims form an integral part of the teaching provided herein in relation to the invention.

BRIEF DESCRIPTION OF THE DRAWINGS

The present invention will now be described in detail with reference to the attached drawings, which are provided purely by way of non-limiting example and in which.

DETAILED DESCRIPTION OF EMBODIMENTS OF THE INVENTION

Figure 1:
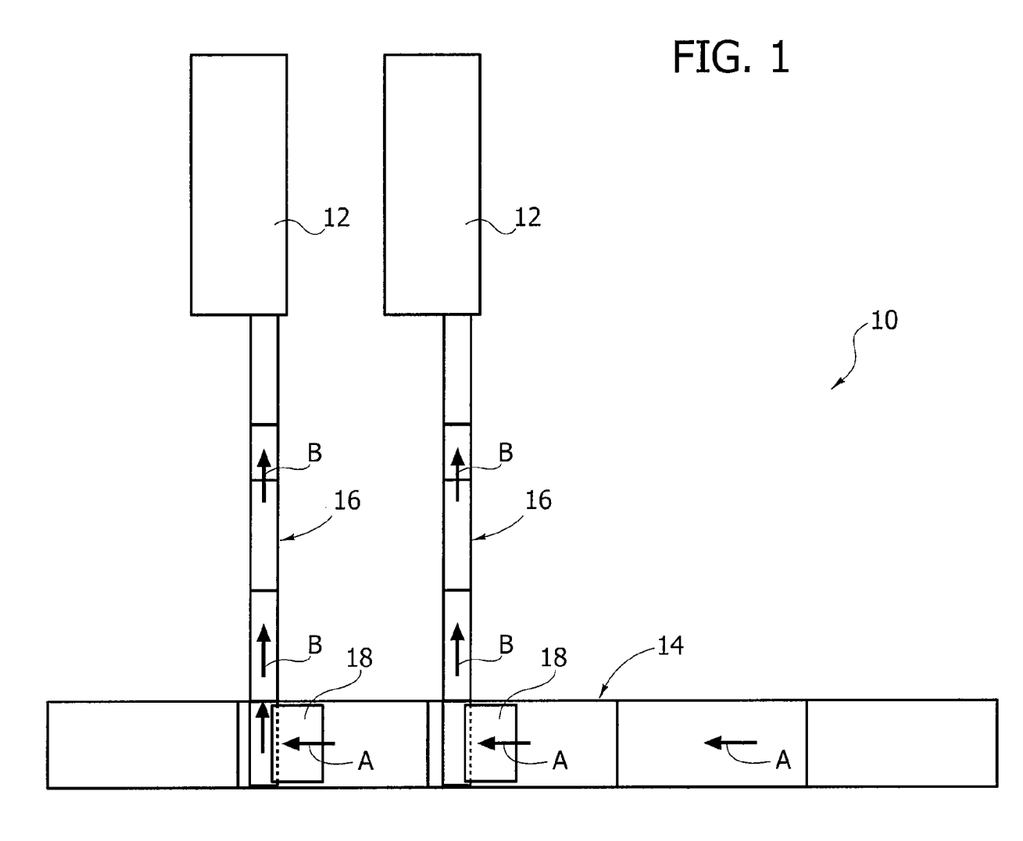
FIG. 1 is a schematic top plan view of a line for conveying foodstuff products to packaging stations.

FIG. 1 is a schematic illustration of a conveying line 10 for feeding foodstuff products to packaging stations schematically represented by 12. The feed line 10 comprises a main conveying line 14, along which the products advance in the direction indicated by the arrows A. Along the main line, the products are usually ordered in arrays of products, each array being set crosswise with respect to the direction of advance A. A series of secondary conveying lines 16 are set branching off the main conveying line 14. Each secondary conveying line 16 feeds the products to a respective packaging station 12. Along the secondary conveying lines 16 the products advance in a direction indicated by the arrows B orthogonal to the direction A along which the products advance on the main conveying line 14. In a position corresponding to the secondary conveying lines 16 inclinable diverters 18 are provided that enable the products to be directed selectively to the respective secondary conveying line 16 or else to continue along the main conveying line 14. During passage from the main conveying line 14 to the secondary conveying line 16 the arrays of products that advance on the main conveying line 14 are deviated by 90°. The main conveying line 14 and the secondary conveying lines 16 are formed by a series of belt conveyors.

Figure 2:
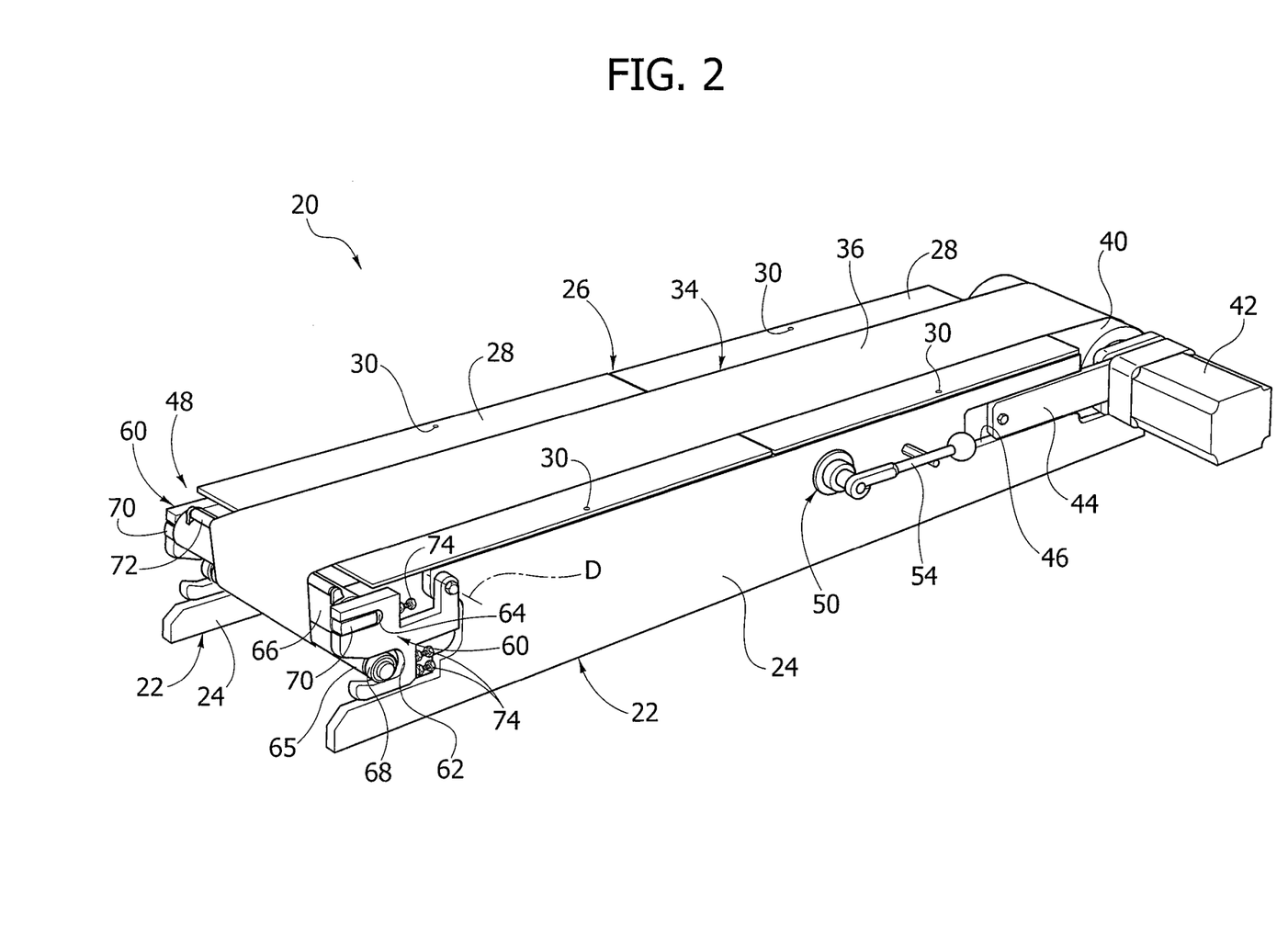
FIG. 2 is a perspective view of a first embodiment of a belt conveyor according to the invention.

FIG. 2 illustrates a first example of a belt conveyor 20 according to the present invention. The belt conveyor 20 comprises a stationary structure 22 including two side walls 24 in the form of a plate, oriented vertically and set parallel to one another. The side walls 24 carry a supporting surface 26 formed by a plurality of sheet-metal plates 28 resting on the top edges of the side walls 24. Preferentially, the plates 28 simply rest on the side walls 24. The plates 28 are preferably provided with reference holes 30 engaged by respective pins 32 (FIG. 3) projecting from the top edges of the side walls 24. The engagement between the pins 32 and the holes 30 serves to define correct positioning of the plates 28 but does not prevent movement upwards of the plates 28. Preferably, no other means of fixing of the plates 28 is provided apart from the positioning pins 32.

The belt conveyor 20 comprises an endless flexible belt 34. The flexible belt 34 has a rectilinear conveying branch 36, which rests on the supporting surface 26. The flexible belt 34 also has a return branch designated by 38 in FIGS. 5 and 6 located underneath the supporting surface 26.

The belt conveyor 20 comprises a motor-driven roller 40 associated to a respective motor-reducer assembly 42. The roller 40 projects in cantilever fashion from the motor-reducer assembly 42. The motor-reducer assembly 42 is connected to the stationary structure 22 by means of a support 44 that engages in a mobile way a guide 46 formed in one of the side walls 24. The guide 46 extends parallel to the longitudinal direction of the belt 24. The flexible belt 34 is in pulling contact with the outer surface of the roller 40.

The belt conveyor 20 comprises at least one return assembly 48 located on the opposite side of the motor-driven roller 40. The return assembly 48 co-operates with the flexible belt 34 and is provided for sending the belt 34 back between the return stretch 38 and the conveying branch 36. In the working configuration, illustrated in FIG. 2, the flexible belt 34 is tensioned between the motor-driven roller 40 and the return assembly 48. The conveying branch 36 is tensioned above the supporting surface 26 and is in contact with the top surface of the plates 28. The tension of the flexible belt 34 prevents a movement upwards of the plates 28. The rotation of the motor-driven roller 40 produces movement of the conveying branch 36 in a conveying direction. During said movement, the conveying branch 36 is in contact with the supporting surface 26 and the weight of the products resting on the branch 36 is sustained by the plates 28.

Figure 4:
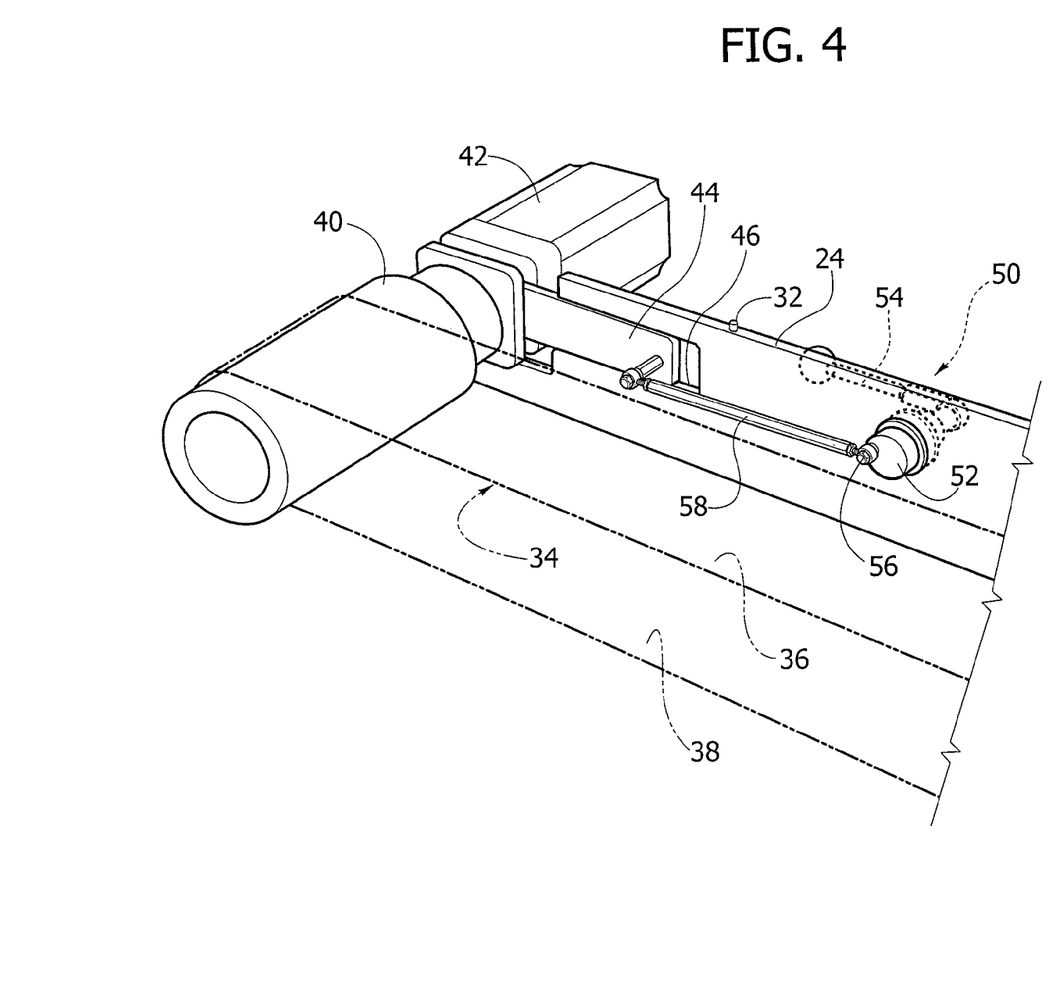
Figure 5:
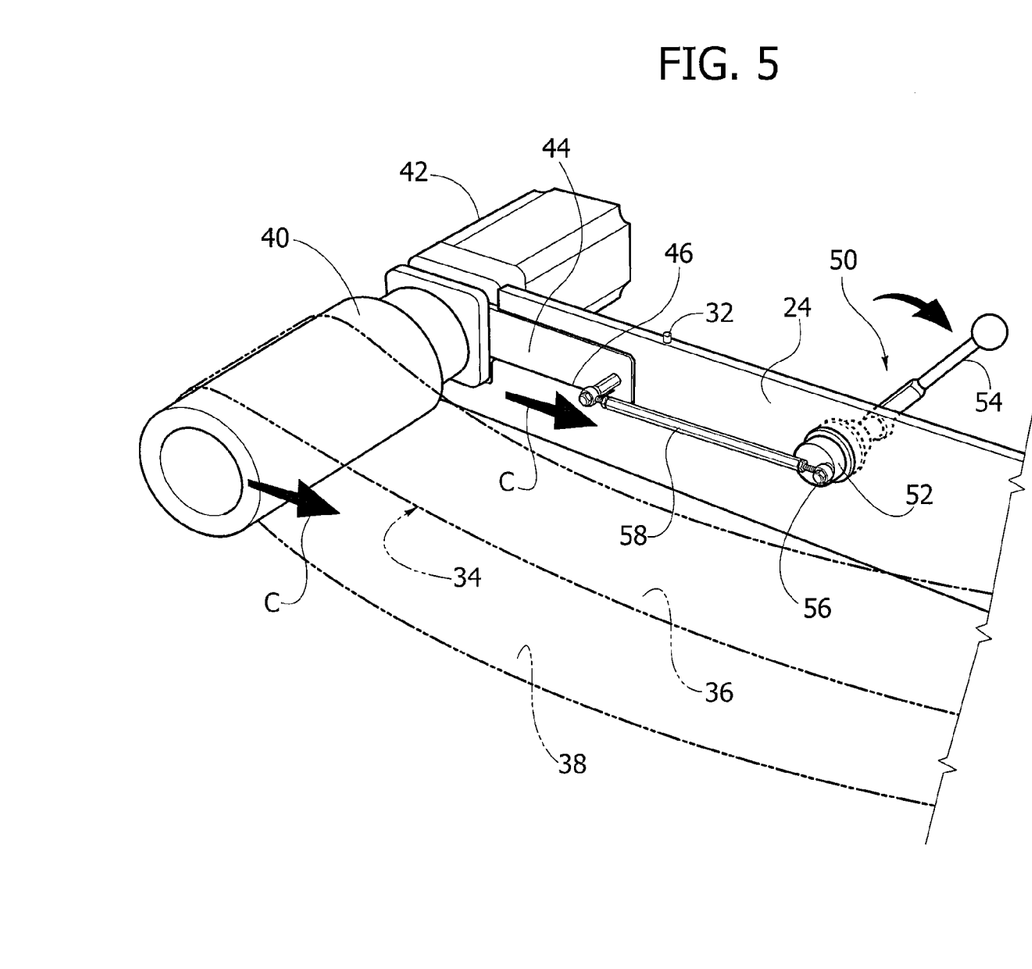

With reference to FIGS. 4 and 5, the motor-driven roller 40 can be displaced in a direction orthogonal to its own axis of rotation between a working position (FIG. 4) and a disassembly position (FIG. 5). A control device 50 is provided for displacing the assembly formed by the roller 40 and by the motor-reducer 42 in the direction indicated by the arrows C in FIG. 5. The control device 50 comprises a rotary member 52 that is carried by the side wall 24 and can be operated in rotation by means of a lever 54. The rotary member 52 has an eccentric pin 56 that is connected to the mobile support 44 of the motor-reducer assembly 42 by means of a connecting rod 58.

Figure 3:
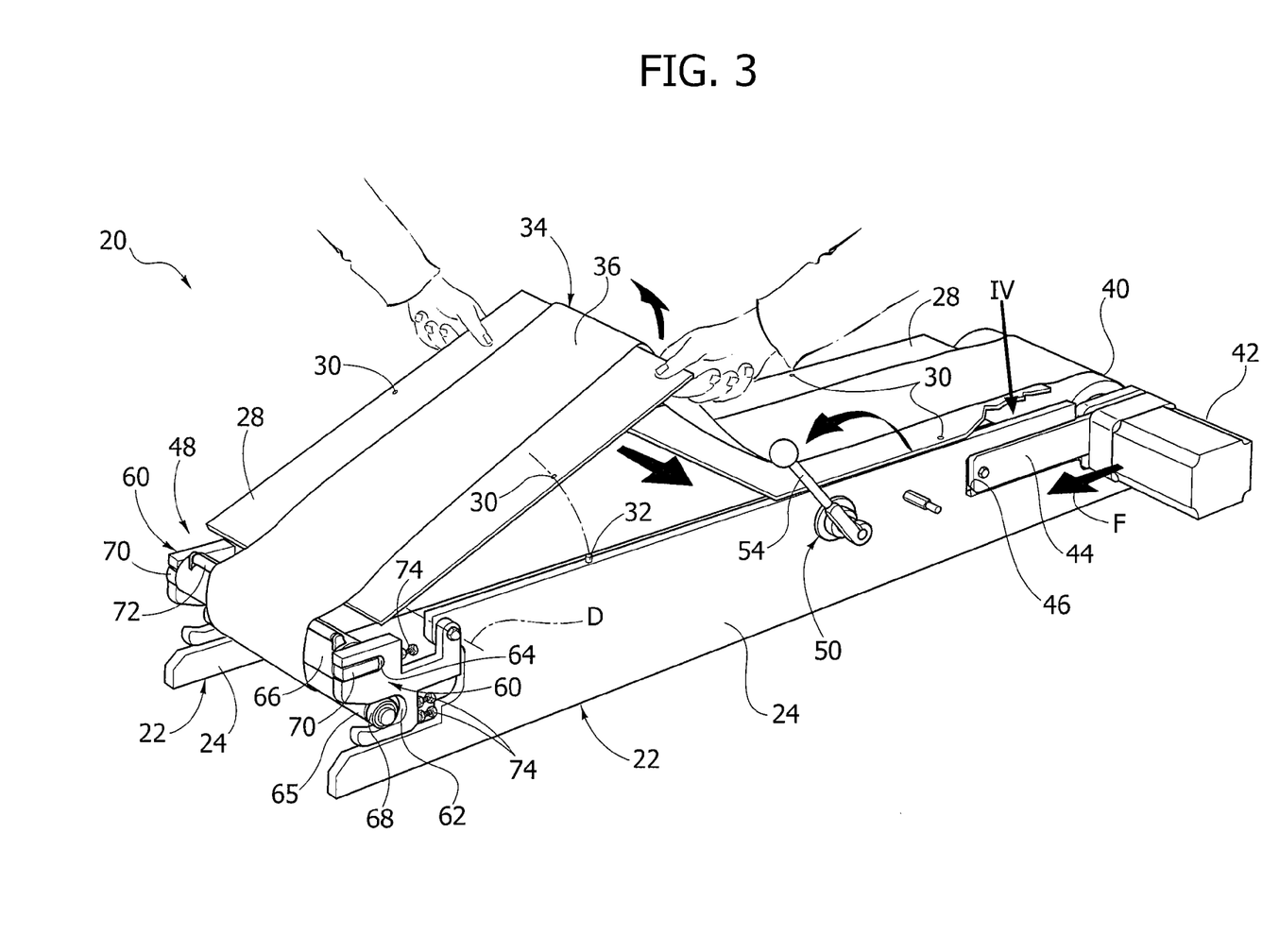
FIGS. 3-7 are schematic perspective views illustrating disassembly of the conveyor of FIG. 2.
Figure 6:
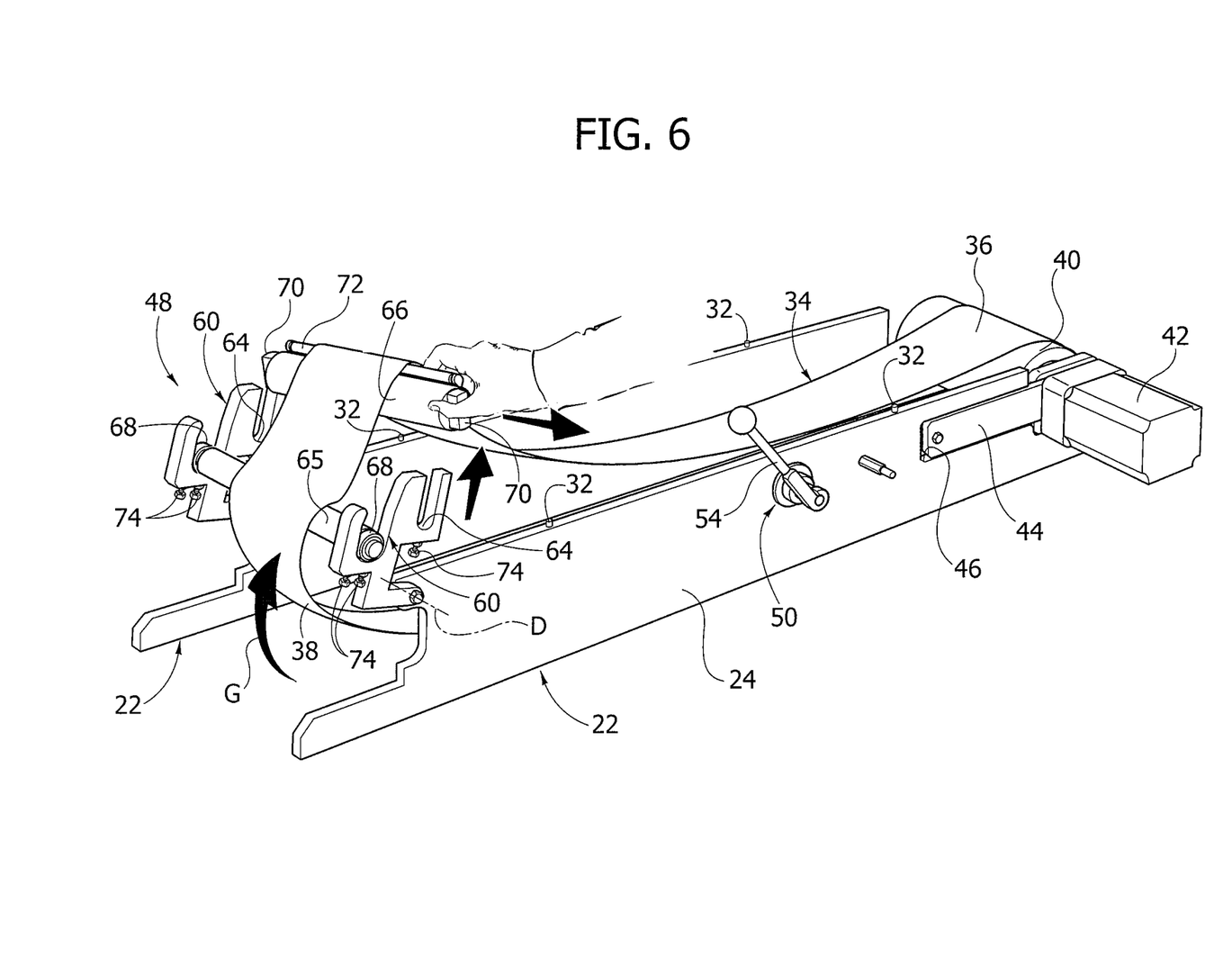

The positions illustrated in FIGS. 4 and 5 correspond, respectively, to those of FIGS. 2 and 3. In FIG. 4 the flexible belt 34 is tensioned and is in the working position, whilst in FIG. 5 the flexible belt 34 is slackened and is in the release position. In FIGS. 3 and 6 slackening of the flexible belt 34 has been exaggerated to render understanding of the drawings more immediate. In actual fact, slackening of the belt corresponds to the travel of the support 44 between the working position and the disassembly position, which is in the region of a few centimetres.

With reference to FIGS. 2, 3 and 6, 7, the return assembly 48 comprises two arms 60 articulated to respective side walls 24 about a common horizontal axis D. Each of the two arms 60 has two fork-like seats 62, 64. The return assembly comprises two return members 65, 66 supported at their ends in a pair of fork-like seats 62, 64. In the example illustrated, the first return member 64 is an idle roller equipped at its ends with bearings 68 inserted in the fork-like seats 62. The second return member 66 comprises a cylindrical support with prismatic ends 70 inserted in the fork-like seats 64. The second return member 66 comprises a roller 72 of small diameter, carried in a rotatable way by the cylindrical support. The number and shape of the return members may vary according to the applications. In general, the return assembly 48 comprises at least one return member supported at its ends in fork-like seats of the arms 60. As will emerge clearly from what follows, the fork-like seats enable removal of the return members in a particularly fast way and without the use of tools.

The arms 60 can be provided with adjustment screws 74 with ends that project in the fork-like seats 64, 66. By means of the adjustment screws 74 it is possible to adjust the inclination of the return members 65, 66 for correcting any possible drifting of the belt 34.

The sequence of operations for disassembly of the belt conveyor 20 is illustrated in FIGS. 2, 3 and 6, 7. Starting from the working configuration of FIG. 2, in a first step the lever 54 is operated, as illustrated in FIG. 3. The device 50 governs displacement of the motor-driven roller 40 in the direction indicated by the arrow F in FIG. 3. Following upon this displacement, the belt 34, initially tensioned, is slackened. After slackening of the belt 34, it is possible to remove the plates 28 as illustrated in FIG. 3. For removal of the plates 28 it is sufficient to raise the plates to disengage them from the pins 32 and then slide them out from underneath the belt 34.

Figure 7:
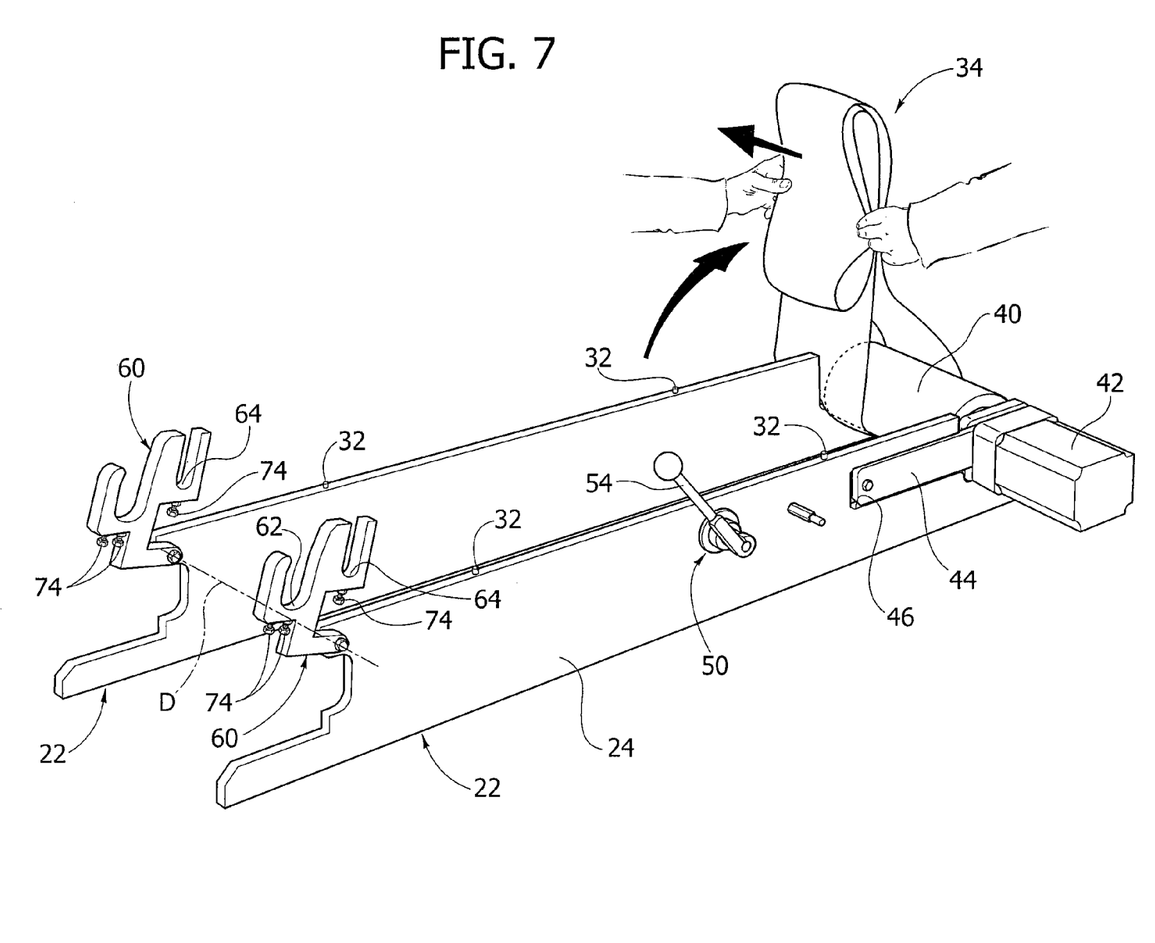

After removal of the plates 28, the return assembly 48 is made to oscillate in the direction indicated by the arrow G in FIG. 6. Next, the return members 65, 66 are extracted from the respective fork-like seats 62, 64 and are removed, as illustrated in FIG. 6. After removal of the return members 65, 66, the belt 34 is released from the motor-driven roller 40, as illustrated in FIG. 7. It may be noted that all the operations are performed without the use of tools or implements. After washing, for reassembly of the belt conveyor the reverse procedure is followed.

A second embodiment of a belt conveyor according to the present invention is illustrated in FIGS. 8 to 14. The elements corresponding to the ones described previously are designated by the same reference numbers.

Figure 8:
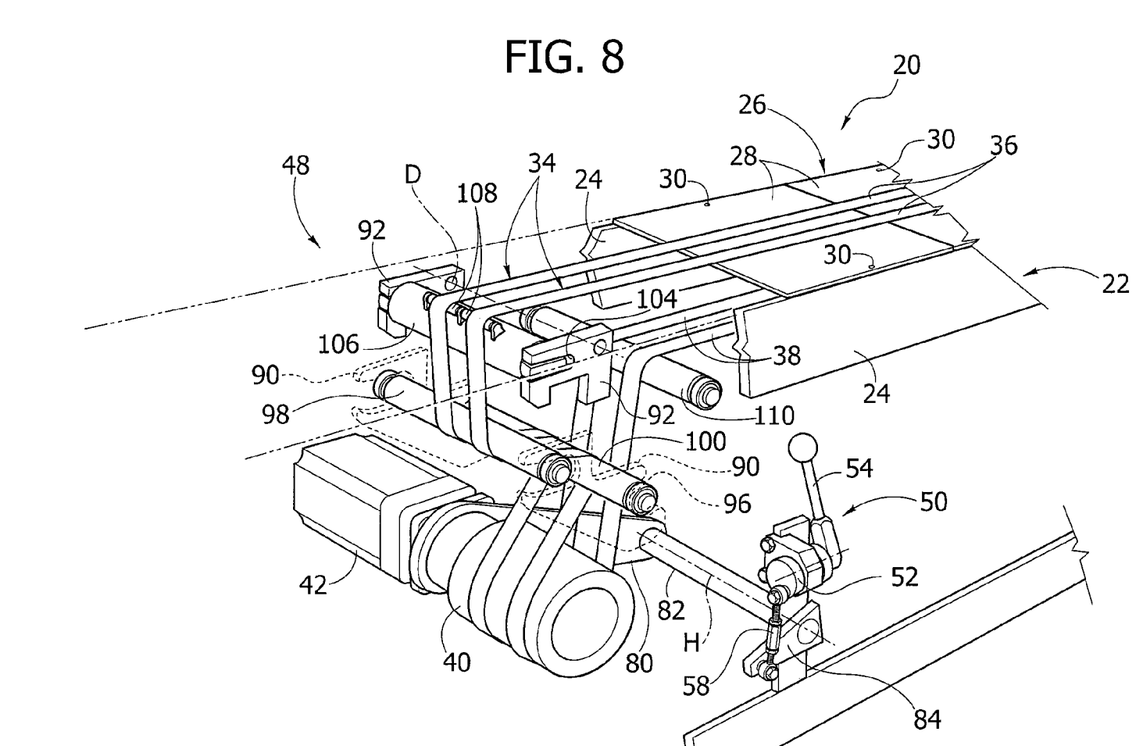
FIG. 8 is a partial perspective view of a second embodiment of a belt conveyor according to the invention.

With reference to FIG. 8, the belt conveyor 20 comprises, as in the case described previously, a stationary structure 22 including two side walls 24 on which plates 28 forming a supporting surface 26 rest. In this case, two flexible endless belts 34 are provided, set parallel to one another and having respective rectilinear conveying branches 36 and respective return branches 38. The belts 34 co-operate with a motor-driven roller 40 carried in cantilever fashion by a motor-reducer assembly 42. The motor-reducer assembly 42 is carried by a support fixed to a shaft 82 that is able to turn about a horizontal axis H. A control device 50 governs rotation of the shaft 82 about the axis H and, consequently, displacement of the motor-driven roller 40 between a working position and a disassembly position. The control device 50 comprises a lever 54 that governs rotation of a rotary member 52 having an eccentric pin connected by means of a connecting rod 58 to a lever 84 fixed to the shaft 82.

The return assembly 48 comprises a first pair of arms 90, indicated in FIG. 8 with a dashed line, and a second pair of arms 92. The arms 90 are fixed and have respective fork-like seats 94, 96 that carry the ends of two idle rollers 98, 100. The arms 92 have respective fork-like seats 104 that carry the ends of a return member 106 carrying two idle rollers 108. The return assembly 48 moreover comprises a further roller 110 supported in a rotatable way by the side walls 24. The sequence of disassembly is illustrated in FIGS. 9 to 14.

Figure 9:
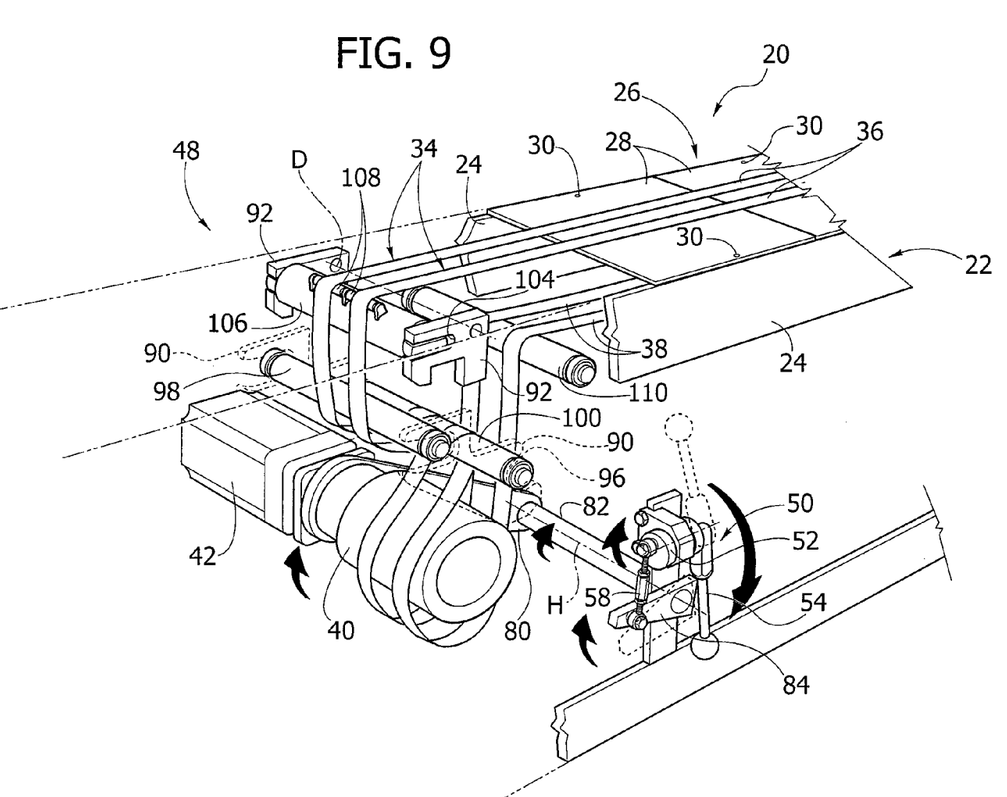
FIGS. 9 to 14 are perspective views illustrating the sequence of disassembly of the conveyor of FIG. 8.

In a first step, as illustrated in FIG. 9, the lever of the control device 50 is operated for governing displacement of the motor-driven roller 40. As may be seen in FIG. 9, after displacement of the motor-driven roller 40 to the disassembly position the belts 34 are slackened.

Figure 10:
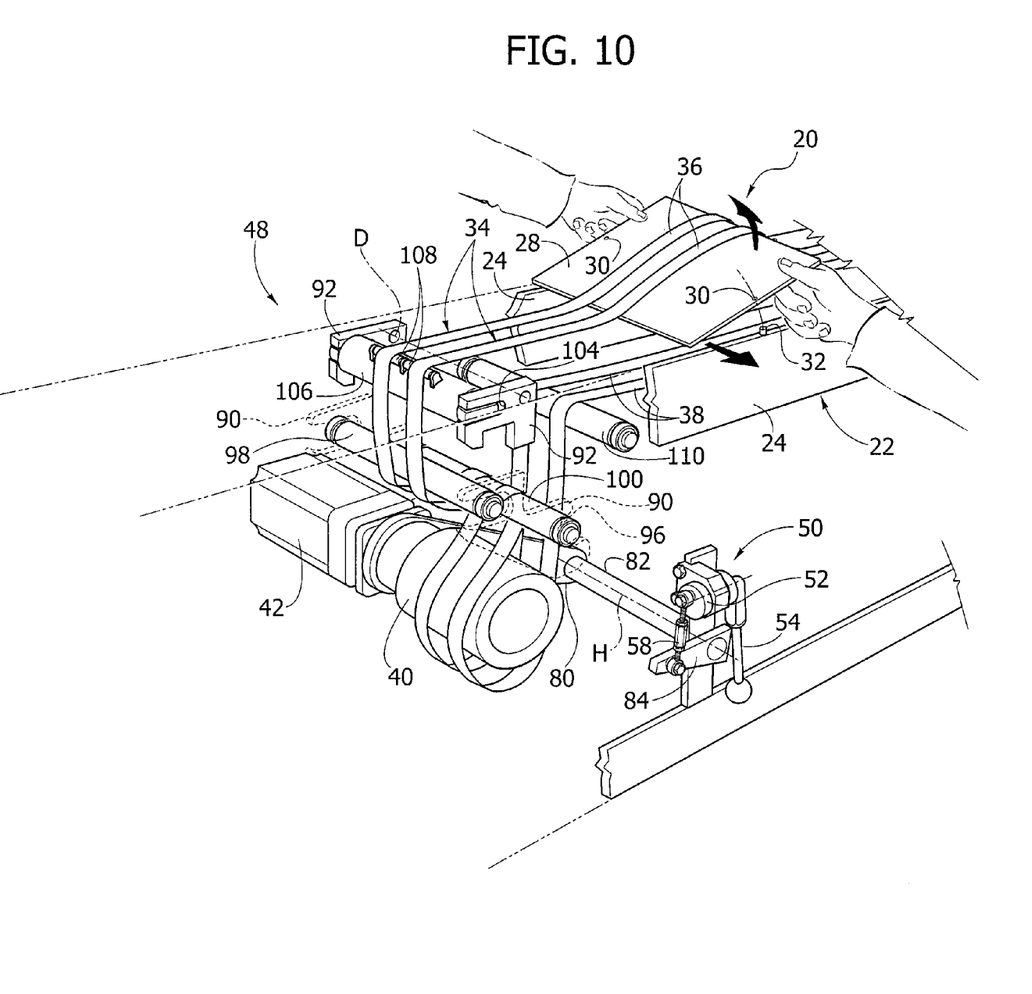

Next, as illustrated in FIG. 10, the plates 28 are removed, an operation that is performed as described previously.

Figure 11:
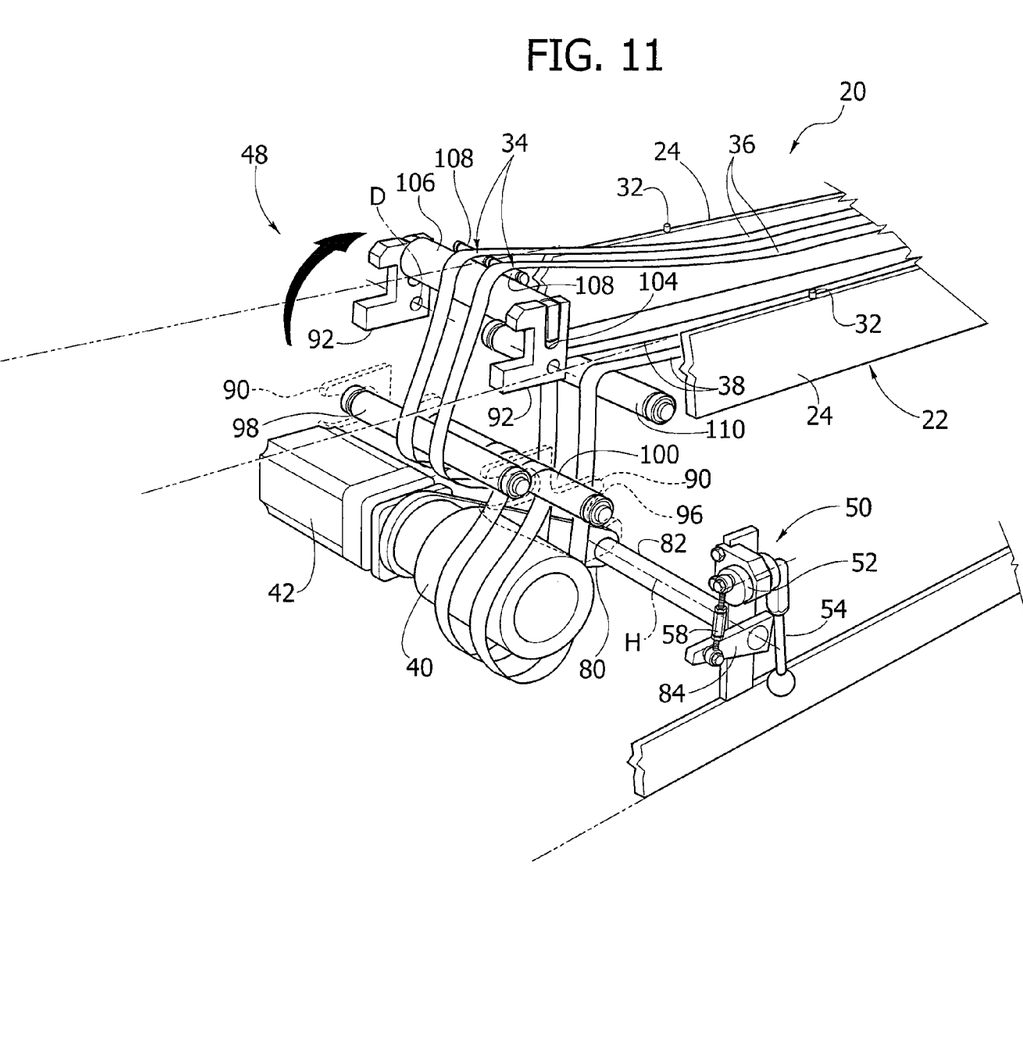
Figure 12:
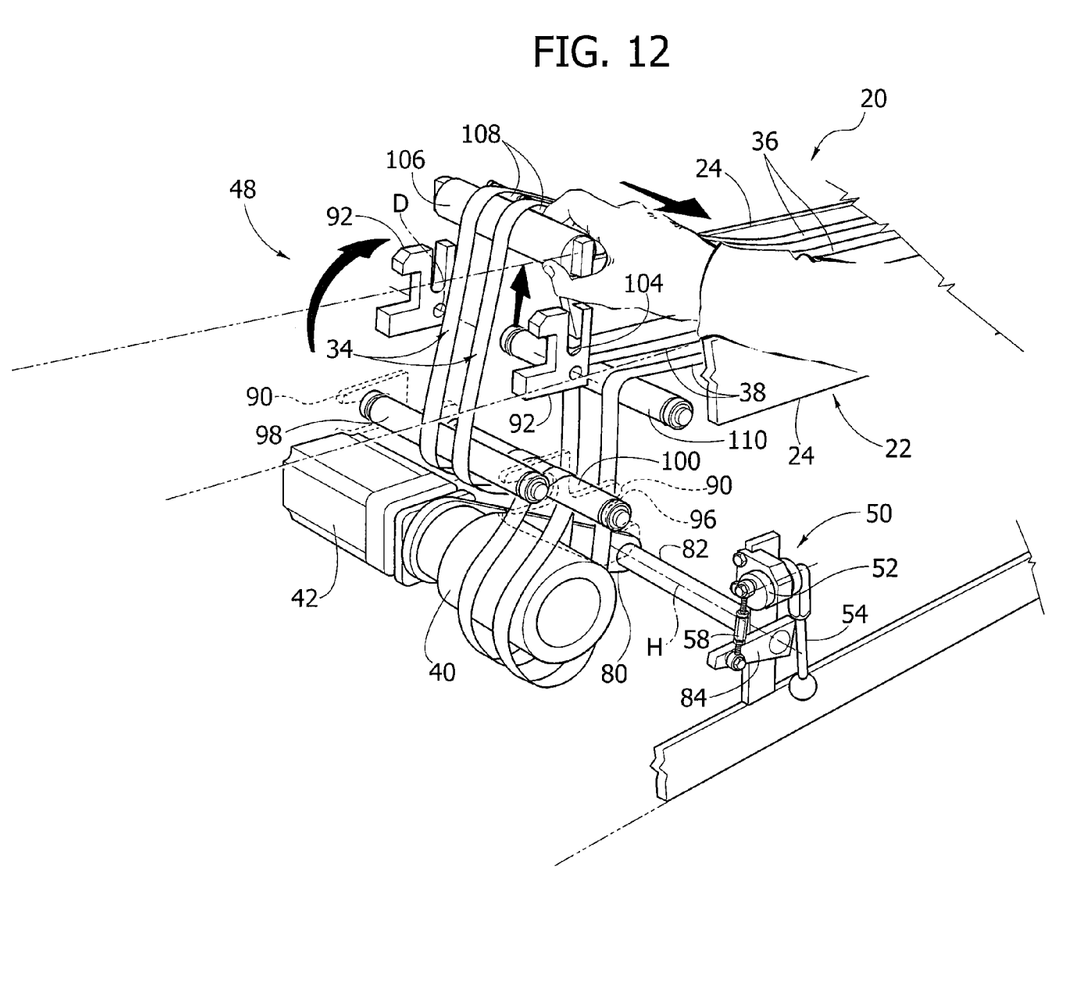
Figure 13:
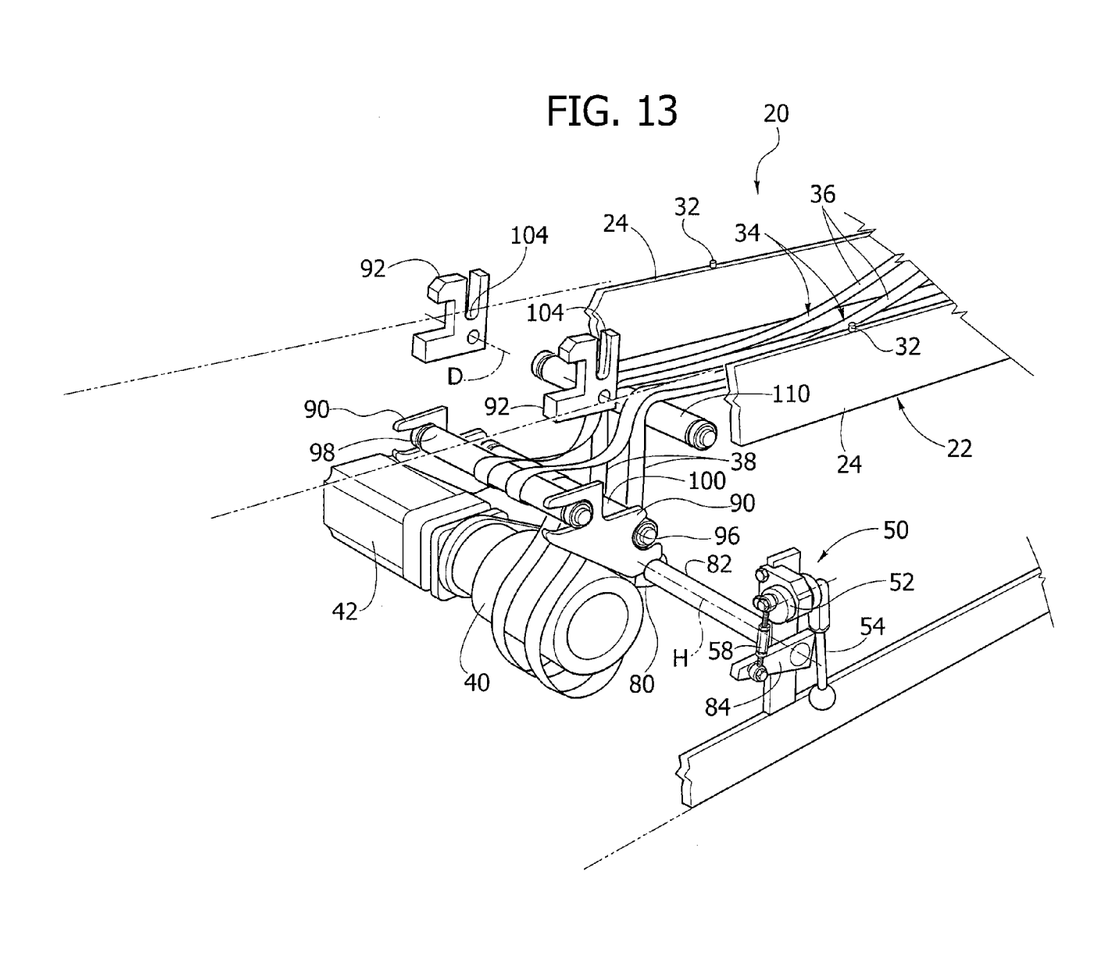
Figure 14:
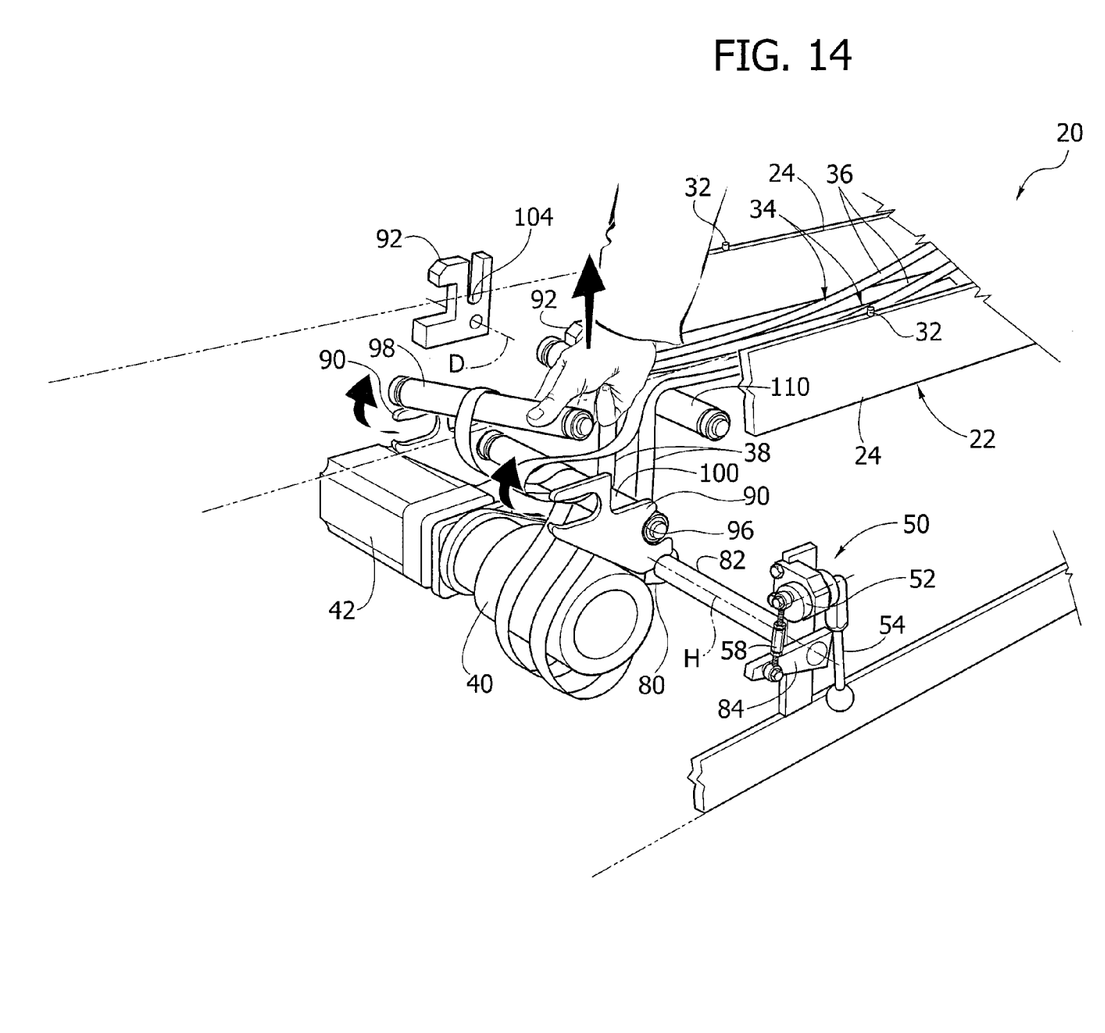

Then, as illustrated in FIG. 11, the arms 92 are turned and the return member 106 is removed, as illustrated in FIG. 12. The return rollers 98 and 100 are then removed as illustrated in FIG. 14. After removal of the rollers 98, 110 it is possible to remove the belts 34.

Of course, without prejudice to the principle of the invention, the details of construction and the embodiments may vary widely with respect to what has been described and illustrated herein, without thereby departing from the scope of the invention as defined in the ensuing claims.

The invention claimed is:

1. A belt conveyor, in particular for conveying foodstuff products to a packaging station, comprising:
   a stationary structure;
   a supporting surface comprising a plurality of plates removably carried by the stationary structure;
   at least one endless flexible belt having a rectilinear conveying branch in contact with said supporting surface and a return branch;
   a motor-driven roller co-operating with said belt for continuously feeding said belt in a conveying direction; and
   at least one return assembly provided for sending the belt back between said return branch and said conveying branch, the return assembly comprising at least one return member supported at its ends,
   said belt conveyor being characterized in that:
   said motor-driven roller can be displaced in a direction orthogonal to its own axis between a working position and a disassembly position;
   a control device is provided for displacing the motor-driven roller between the working position and the disassembly position;
   in the working position the conveying branch of said belt is tensioned on said plates and in the disassembly position the belt is slackened and leaves the plates free to be removed with a movement upwards; and the return assembly comprises at least one pair of arms having at least one pair of fork-like seats, supported in which are the ends of said at least one return member.

2. The belt conveyor according to claim 1, wherein said motor-driven roller is carried in cantilever fashion by a motor-reducer assembly.

3. The belt conveyor according to claim 2, wherein said motor-reducer assembly is carried by a support that can be displaced by means of said control device.

4. The belt conveyor according to claim 3, wherein said control device comprises a lever that can be operated manually, which governs displacement of said support by means of a rotary member and a connecting rod.

5. The belt conveyor according to claim 1, wherein said plates rest on top edges of side walls of said supporting structure, said plates being provided with holes engaged by respective positioning pins projecting from said top edges of said side walls.

6. The belt conveyor according to claim 1, wherein said arms of said return assembly can turn about a common horizontal axis.

\* \* \* \* \*